United States Patent
Nada et al.

(10) Patent No.: US 10,118,493 B2
(45) Date of Patent: Nov. 6, 2018

(54) SYSTEM AND METHOD FOR CONTROLLING REGENERATIVE BRAKING FORCE OF A VEHICLE

(71) Applicant: TOYOTA JIDOSHA KABUSHIKI KAISHA, Toyota-shi, Aichi-ken (JP)

(72) Inventors: Mitsuhiro Nada, Toyota (JP); Kenji Umayahara, Miyoshi (JP); Takuya Nakagami, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 121 days.

(21) Appl. No.: 14/940,364

(22) Filed: Nov. 13, 2015

(65) Prior Publication Data

US 2016/0137066 A1    May 19, 2016

(30) Foreign Application Priority Data

Nov. 14, 2014 (JP) ................................. 2014-231400

(51) Int. Cl.
*B60L 7/12* (2006.01)
*B60L 1/00* (2006.01)
(Continued)

(52) U.S. Cl.
CPC ............... *B60L 7/12* (2013.01); *B60L 1/00* (2013.01); *B60L 1/003* (2013.01); *B60L 7/18* (2013.01);
(Continued)

(58) Field of Classification Search
CPC .............. B60C 23/0471; B60C 23/044; B60C 23/0442; B60C 23/0472; B60C 23/0479
See application file for complete search history.

(56) References Cited

U.S. PATENT DOCUMENTS 5,839,800 A * 11/1998 Koga .................. B60K 6/46
                                                    303/152
6,459,980 B1 * 10/2002 Tabata .................. B60K 6/46
                                                    701/70
(Continued)

FOREIGN PATENT DOCUMENTS

CN    101668653 A    3/2010
EP    2 543 536 A1   1/2013
(Continued)

OTHER PUBLICATIONS

Machine Translation of Marr.*

*Primary Examiner* — Jean Paul Cass
(74) *Attorney, Agent, or Firm* — Finnegan, Henderson, Farabow, Garrett & Dunner, LLP

(57) ABSTRACT

A vehicle includes: a fuel cell that receives supply of fuel gas and generates electric power; a motor that is driven by the generated electric power of the fuel cell; an electric power consuming auxiliary machine; a mechanical brake; a secondary cell, and a deceleration control unit. The deceleration control unit limits the regenerative braking force to be obtained by the regenerative control, to an upper limit regenerative braking force corresponding to the maximum consumed electric power that the electric power consuming auxiliary machine is capable of consuming such that regenerative electric power associated with regenerative braking is consumed by the electric power consuming auxiliary machine, and when the electric power consuming auxiliary machine is incapable of consuming the regenerative electric power to the maximum consumed electric power, the residual regenerative electric power is consumed by charge of the secondary cell.

6 Claims, 7 Drawing Sheets

(51) Int. Cl.
  *B60L 7/18*     (2006.01)
  *B60L 7/26*     (2006.01)
  *B60L 11/18*    (2006.01)

(52) U.S. Cl.
  CPC ............ *B60L 7/26* (2013.01); *B60L 11/1881* (2013.01); *B60L 2240/12* (2013.01); *B60L 2240/80* (2013.01); *B60L 2250/26* (2013.01); *B60L 2260/30* (2013.01); *Y02T 10/7258* (2013.01); *Y02T 90/34* (2013.01)

(56) References Cited

U.S. PATENT DOCUMENTS

| | | | | |
|---|---|---|---|---|
| 7,240,748 | B2* | 7/2007 | Kira | B60K 6/44 180/65.25 |
| 8,970,161 | B1* | 3/2015 | Cuadros | H02J 7/0068 320/101 |
| 9,423,465 | B1* | 8/2016 | Watts | H02J 7/007 |
| 2003/0085680 | A1* | 5/2003 | Wakitani | B60L 3/0023 318/432 |
| 2003/0094002 | A1* | 5/2003 | Hibino | F17C 5/06 62/46.1 |
| 2003/0137073 | A1* | 7/2003 | Hunold | B29C 45/0013 264/104 |
| 2004/0239181 | A1 | 12/2004 | Obayashi et al. | |
| 2005/0102082 | A1* | 5/2005 | Joe | B60K 6/445 701/54 |
| 2005/0104445 | A1* | 5/2005 | Choi | B60K 6/26 303/152 |
| 2006/0113129 | A1* | 6/2006 | Tabata | B60K 6/365 180/65.25 |
| 2006/0152180 | A1* | 7/2006 | Tahara | B60K 6/26 318/139 |
| 2006/0276288 | A1* | 12/2006 | Iwanaka | B60K 6/365 475/5 |
| 2007/0093359 | A1* | 4/2007 | Kobayashi | B60K 6/48 477/107 |
| 2008/0059035 | A1* | 3/2008 | Siddiqui | B60K 6/445 701/93 |
| 2008/0269009 | A1 | 10/2008 | Marr et al. | |
| 2009/0079145 | A1* | 3/2009 | Inoue | B60G 15/063 280/5.515 |
| 2009/0118962 | A1* | 5/2009 | Heap | B60K 6/365 701/99 |
| 2009/0160380 | A1* | 6/2009 | Yamada | B60L 15/20 318/400.15 |
| 2009/0200095 | A1* | 8/2009 | Kawasaki | B60K 6/365 180/65.265 |
| 2013/0289830 | A1* | 10/2013 | Kamiya | B60L 7/18 701/48 |
| 2016/0006059 | A1* | 1/2016 | Kwon | B60L 11/1892 429/434 |
| 2016/0039292 | A1 | 2/2016 | Takahashi | |
| 2016/0126565 | A1* | 5/2016 | Kwon | H01M 8/04029 429/437 |

FOREIGN PATENT DOCUMENTS

| | | |
|---|---|---|
| JP | 2002-255018 A | 9/2002 |
| JP | 2005-100752 A | 4/2005 |
| JP | 2005-205928 A | 8/2005 |
| JP | 2005-322454 A | 11/2005 |
| JP | 2006-109643 A | 4/2006 |
| JP | 2006-160131 A | 6/2006 |
| JP | 2008-125329 A | 5/2008 |
| JP | 2013-99081 | 5/2013 |
| KR | 10-2014-0065730 A | 5/2014 |
| WO | WO2014/167643 A1 | 10/2014 |

* cited by examiner

FIG. 6
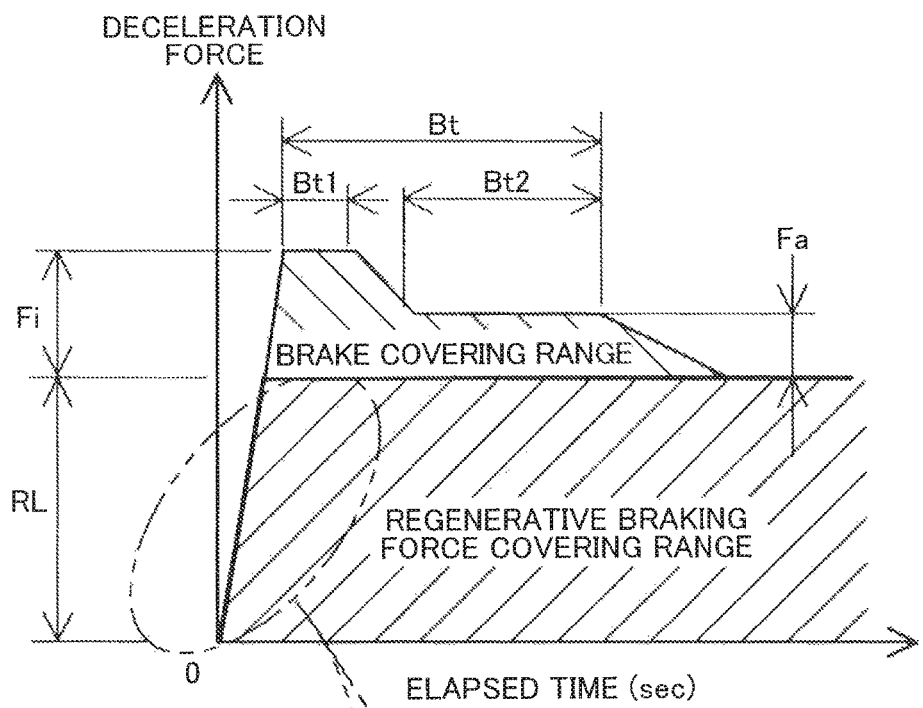
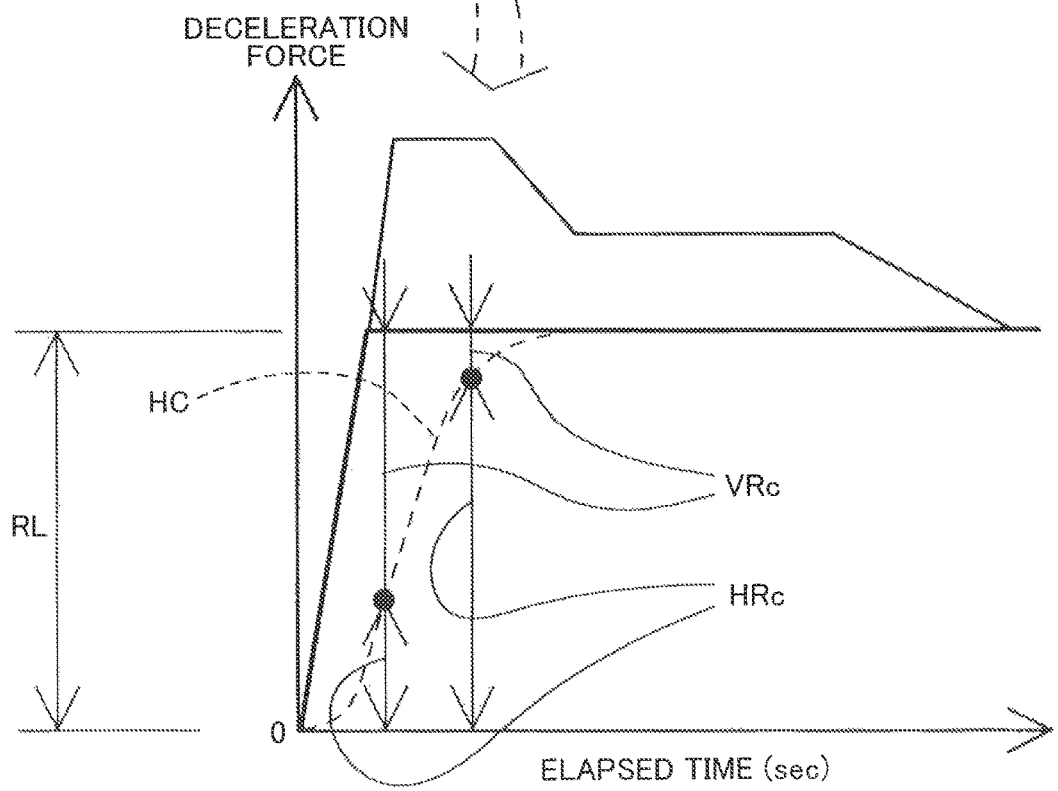

SYSTEM AND METHOD FOR CONTROLLING REGENERATIVE BRAKING FORCE OF A VEHICLE

INCORPORATION BY REFERENCE

The disclosure of Japanese Patent Application No. 2014-231400 filed on Nov. 14, 2014 including the specification, drawings and abstract is incorporated herein by reference in its entirety.

BACKGROUND OF THE INVENTION

1. Field of the Invention

The invention relates to a vehicle.

2. Description of Related Art

A fuel cell is mounted in a vehicle, together with a motor, and receives the supply of fuel gas to generate electric power. The motor is driven by the generated electric power of the fuel cell, and functions as an electric generator to generate regenerative electric power, depending on the vehicle running state. By consuming the regenerative electric power, the vehicle is decelerated by regenerative braking force. Therefore, there has been proposed a technique of actualizing the deceleration by achieving the diversification of the consumption of the regenerative electric power (for example, Japanese Patent Application Publication No. 2013-99081).

SUMMARY OF THE INVENTION

The deceleration technique proposed in the above patent literature makes it possible to decelerate the vehicle by consuming the regenerative electric power as the drive electric power for a mechanical brake, and to assist the regenerative braking force with the mechanical brake. In the deceleration technique, it is assumed that the mechanical brake is driven by the excess regenerative electric power after the regenerative electric power is consumed by the charge of the secondary cell. Therefore, the excess regenerative electric power for driving the mechanical brake varies from hour to hour, depending on the electricity storage state of the secondary cell. However, although the mechanical brake is configured to be driven promptly in response to a brake operation for achieving an immediate and secure deceleration of the vehicle, it is actually difficult to perform the drive control of the mechanical brake continuously from hour to hour, because of the apparatus configuration. Therefore, it has been demanded to achieve the simplification of the control of the mechanical brake when the mechanical brake assists the regenerative braking force, and therewith to enhance the effectiveness of the vehicle braking assist by the mechanical brake.

A vehicle according to an aspect of the invention includes: a fuel cell that receives supply of fuel gas and generates electric power; a motor that is driven by the generated electric power of the fuel cell; an electric power consuming auxiliary machine that consumes electric power to be driven; a mechanical brake that generates a vehicle braking force corresponding to depression of a brake pedal; a secondary cell that is capable of being charged and discharged; and a deceleration control unit that is configured to execute vehicle deceleration in a situation without the depression of the brake pedal, while assisting a regenerative braking force to be obtained by a regenerative control of the motor, with the vehicle braking force by the mechanical brake. Then, the deceleration control unit is configured to limit the regenerative braking force to be obtained by the regenerative control, to an upper limit regenerative braking force corresponding to the maximum consumed electric power that the electric power consuming auxiliary machine is capable of consuming, such that regenerative electric power associated with regenerative braking is consumed by the electric power consuming auxiliary machine, and such that when the electric power consuming auxiliary machine is incapable of consuming the regenerative electric power to the maximum consumed electric power, the residual regenerative electric power is consumed by charge of the secondary cell.

When assisting the regenerative braking force with the vehicle braking force by the mechanical brake, in the vehicle in the above aspect, the deceleration control unit limits the regenerative braking force to be obtained by the regenerative control, to the upper limit regenerative braking force to be obtained by the consumption of the regenerative electric power corresponding to the maximum consumed electric power that the electric power consuming auxiliary machine is capable of consuming. Then, when the electric power consuming auxiliary machine is capable of consuming the maximum consumed electric power, it is possible to avoid consuming the regenerative electric power by the charge of the secondary cell. Even if the regenerative electric power is consumed by the charge of the secondary cell, it is necessary to consume less regenerative electric power by the charge. Accordingly, in the drive control of the mechanical brake for assisting the upper limit regenerative braking force, it is possible to remove the influence of the electricity storage state of the secondary cell, or to reduce the influence of the electricity storage state of the secondary cell, and therefore, it is only necessary to perform the drive control of the mechanical brake such that a roughly predetermined vehicle braking force is obtained. As a result, according to the vehicle in the aspect, it is unnecessary to perform the drive control of the mechanical brake continuously from hour to hour, and therefore, it is possible to simplify the control of the mechanical brake when assisting the regenerative braking force with the mechanical brake, and to enhance the effectiveness of the vehicle braking assist by the mechanical brake.

In the above aspect, the upper limit regenerative braking force may be set corresponding to vehicle speed. Thereby, when the vehicle is running at a low speed, it is possible to prevent the vehicle from being greatly decelerated unexpectedly, allowing a vehicle driver to hardly feel uncomfortable, and allowing the achievement of the maintenance or improvement of drivability.

In the above aspect, in a case where a target vehicle braking force as a deceleration target is greater than the upper limit regenerative braking force of the motor, the deceleration control unit may be configured to make up for a difference between the target vehicle braking force and the upper limit regenerative braking force of the motor, with the vehicle braking force by the mechanical brake. Thereby, it is only necessary to perform the drive control of the mechanical brake such that a vehicle braking force equivalent to the above difference is obtained, resulting in the simplification of the drive control of the mechanical brake.

In the above aspect, in a case where a target vehicle braking force as a deceleration target is greater than the upper limit regenerative braking force of the motor, when assisting the upper limit regenerative braking force with the vehicle braking force by the mechanical brake, the deceleration control unit may be configured to assist the upper limit regenerative braking force with a first vehicle braking force and a second vehicle braking force by sequentially performing a first drive control and a second drive control in this order, the second vehicle braking force being less than the first vehicle braking force, the first drive control being a drive control that makes the mechanical brake generate the first vehicle braking force, the second drive control being a drive control that makes the mechanical brake generate the second vehicle braking force. This provides the following advantages. Because of an apparatus configuration in which the mechanical brake includes a driven apparatus, the movement of the driven apparatus involves backlash at the beginning of the drive. For the inhibition of the backlash, it is useful to drive the driven apparatus relatively greatly. Therefore, according to the vehicle in the mode, by the first drive control, the mechanical brake is driven such that the greater first vehicle braking force is generated at the beginning of the drive, and therefore, the execution of the first drive control makes it possible to achieve the vehicle deceleration with the backlash inhibited. Therewith, by the second drive control following the first drive control, even the less second vehicle braking force makes it possible to ensure the vehicle deceleration by the mechanical brake.

In the above aspect, the deceleration control unit may be configured to execute control such that the secondary cell is charged with the regenerative electric power, in the middle of drive activation when the electric power consuming auxiliary machine consumes the regenerative electric power to be driven. This provides the following advantages. First, in the middle of the drive activation, it is possible to exert a regenerative braking force corresponding to the sum of the regenerative electric power consumption associated with the charge of the secondary cell and the electric power consumption at the activation of the electric power consuming auxiliary machine. Furthermore, after the drive activation, the regenerative electric power consumption by the electric power consuming auxiliary machine becomes stable, and therefore, the regenerative braking force associated with the regenerative electric power consumption by the electric power consuming auxiliary machine becomes stable. As a result, according to the vehicle in the mode, it is possible to avoid an unexpected fluctuation in the vehicle deceleration, allowing the vehicle driver to hardly feel uncomfortable, and allowing the achievement of the maintenance or improvement of drivability.

In the above aspect, the deceleration control unit may be configured to execute the assist of the upper limit regenerative braking force with the vehicle braking force by the mechanical brake, for an assist duration time that is specified corresponding to vehicle speed. This provides the following advantages. The mechanical brake, which generates heat by the drive, can be cooled by the vehicle air flowing around the mechanical brake, in association with vehicle running. The vehicle air increases as the vehicle speed becomes higher, and therefore, the cooling of the mechanical brake is promoted as the vehicle speed becomes higher. Therefore, when the assist of the upper limit regenerative braking force with the vehicle braking force by the mechanical brake is executed for the assist duration time that is specified corresponding to the vehicle speed, it is possible to suppress the deterioration of the action of the brake due to the heating of the mechanical brake, and to ensure the assist with the vehicle braking force by the mechanical brake.

In the above aspect, the deceleration control unit may be configured to set a different time as the assist duration time for each vehicle speed range of a low vehicle speed range, a middle vehicle speed range and a high vehicle speed range, and may set the assist duration time for the middle vehicle speed range, to a longer time than that for the low vehicle speed range and that for the high vehicle speed range. Thereby, it is possible to suppress the deterioration of the action of the brake due to the heating of the mechanical brake, with a high effectiveness. This leads to the enhancement of the effectiveness of the assist of the upper limit regenerative braking force with the vehicle braking force by the mechanical brake.

Here, the invention can be actualized in various modes, and for example, can be applied to a fuel cell system that is mounted in a movable body such a vehicle, in addition to a deceleration control apparatus and a running control method for a vehicle in which a fuel cell is mounted.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 6 is an explanatory diagram for explaining a manner of the exertion of the formed braking force in the brake assist deceleration and the vehicle braking force by the brake;

DETAILED DESCRIPTION OF EMBODIMENTS

Figure 1:
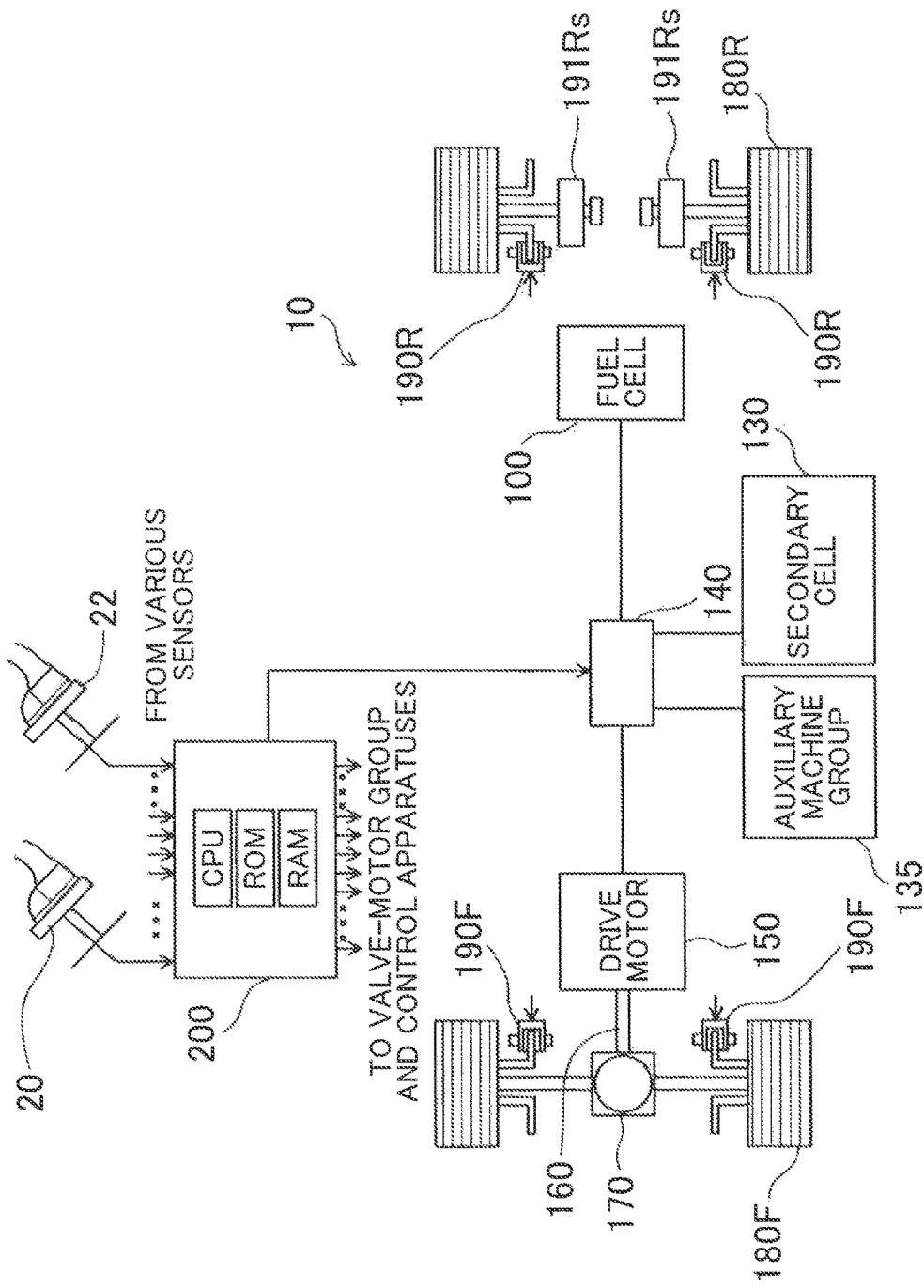
FIG. 1 is an explanatory diagram schematically showing a configuration of a vehicle 10 according to an embodiment of the invention.

Hereinafter, embodiments of the invention will be described based on the drawings. FIG. 1 is an explanatory diagram schematically showing a configuration of a vehicle 10 according to an embodiment of the invention. The vehicle 10 includes a fuel cell 100, a control unit 200, a secondary cell 130, an auxiliary machine group 135, a distribution controller 140, a drive motor 150, a drive shaft 160, a distribution gear 170, front wheels 180F, rear wheels 180R, front wheel brakes 190F, and rear wheel brakes 190R. The vehicle 10 in the embodiment is a front-wheel-drive vehicle. The drive force of the drive motor 150 is transmitted from the drive shaft 160 to the front wheels 180F, and the drive force is distributed to the right and left front wheels by the distribution gear 170. The front wheel brakes 190F and the rear wheel brakes 190R, which are configured as hydraulically-driven disc brakes provided on the front wheels and the rear wheels, generate a vehicle braking force corresponding to the depression of a brake pedal 22 by a driver, under the control by the control unit 200, and performs the deceleration and braking stop of the vehicle 10. The right and left rear wheels 180R are coupled driving wheels that are suspended on suspensions 191Rs independently from each other, and therefore, are not provided with the drive shaft 160. Here, the front wheels 180F also are suspended on suspensions not illustrated, respectively.

The fuel cell 100 receives the supply of fuel gas and oxidation gas, and brings about an electrochemical reaction of fuel and oxygen to generate electric power. The gas supply quantity to the fuel cell 100 is calculated by the control unit 200, in response to an output request based on the depression quantity of an accelerator pedal 20 by the driver. Based on the output request, the control unit 200 controls the operation of the fuel cell 100 and the secondary cell 130. The vehicle 10 includes a fuel gas supply system and a fuel gas exhaust system that supply and exhaust the fuel gas for the fuel cell 100, an oxidation gas supply system and an oxidation gas exhaust system that supply and exhaust the oxidation gas for the fuel cell 100, and a coolant circulation system for cooling the fuel cell 100. The constituents are not directly related to the spirit of the invention, and the descriptions are omitted. Here, a compressor included in the oxidation gas supply system, a circulation pump included in the coolant circulation system, and the like, which are included in the auxiliary machine group 135, are driven to consume electric power in response to the control by the control unit 200, and exert predetermined functions such as the supply of the oxidation gas and the circulation supply of coolant.

The secondary cell 130 is configured, for example, as a nickel-metal hydride cell, a lithium-ion cell or the like, and outputs the charged electric power through the distribution controller 140, as the drive electric power of the drive motor 150 and the auxiliary machine group 135. The secondary cell 130 not only can be directly charged using the generated electric power by the fuel cell 100, and but also can be charged by the electric power obtained by regenerating, with the drive motor 150, the kinetic energy of the vehicle 10 at the time of the vehicle deceleration when the depression of the accelerator pedal 20 is reduced by the driver, or when the brake pedal 22 is depressed. The distribution controller 140 performs the distribution control of the electric power quantity to be brought from the fuel cell 100 to the drive motor 150, the electric power quantity to be brought from the secondary cell 130 to the drive motor 150, and the drive electric power quantity to be transferred to each auxiliary machine in the auxiliary machine group 135. Further, at the time of the deceleration of the vehicle 10, the distribution controller 140 transfers the electric power regenerated by the drive motor 150, to the secondary cell 130, for cell charge. This point will be described later. Here, the generation of the regenerative electric power from the drive motor 150, and the already-described electric power distribution and cell charge by the distribution controller 140 are performed under the control by the control unit 200. Further, the distribution controller 140 includes a step-down transformer in addition to a DC-DC converter not illustrated, and distributes the electric power to the drive motor 150 and the auxiliary machine group 135, after the electric power is regulated to drive voltages for the electrically-powered apparatuses.

The drive motor 150 receives the generated electric power of the fuel cell 100 through the distribution controller 140, to be driven, and functions as an electric motor for moving the vehicle 10. Further, when the vehicle 10 is decelerated, the drive motor 150 functions as an electric generator for regenerating the kinetic energy of the vehicle 10 to electric energy, under the control by the control unit 200. The drive shaft 160 is a revolving shaft for transmitting the drive force output by the drive motor 150, to the distribution gear 170. The distribution gear 170 distributes the drive force to the right and left front wheels 180F.

The control unit 200 is configured as a so-called microcomputer including a CPU to execute logical operations, a ROM, a RAM and the like. Then, the control unit 200 performs various controls of the vehicle 10 such as the drive control of a non-illustrated injector involved in the gas supply and exhaust and various valves, the regenerative control of the drive motor 150, and the drive control of the front wheel brake 190F and the rear wheel brake 190R, in response to the input from an accelerator sensor to detect the depression quantity of the accelerator pedal 20, the input from a brake sensor to detect the depression quantity of the brake pedal 22, the input from a vehicle speed detection sensor not illustrated, and the like.

Next, a brake assist deceleration control to be performed in the vehicle 10 according to the embodiment will be described. The vehicle 10 in the embodiment runs by the drive force of the drive motor 150 that is driven by the generated electric power of the fuel cell 100, and therefore, cannot produce an engine brake, unlike an existing vehicle with an internal-combustion engine. Therefore, the vehicle 10 in the embodiment achieves a vehicle deceleration equivalent to the engine brake, by assisting a regenerative braking force to be obtained by the regenerative control of the drive motor 150, with a vehicle braking force using the front wheel brake 190F and the rear wheel brake 190R. The vehicle deceleration equivalent to the engine brake corresponds to the vehicle deceleration in a situation without the depression of the brake pedal, and the vehicle 10 in the embodiment executes the brake assist deceleration control for achieving the vehicle deceleration equivalent to the engine brake, in the case where the depression of the accelerator pedal 20 is reduced during the running in a drive range, or in the case of a downward slope running in which the depression of the accelerator pedal 20 is not changed but the vehicle speed increases. Hereinafter, the front wheel brake 190F and the rear wheel brake 190R are collectively referred to as a mechanical brake 190.

Figure 2:
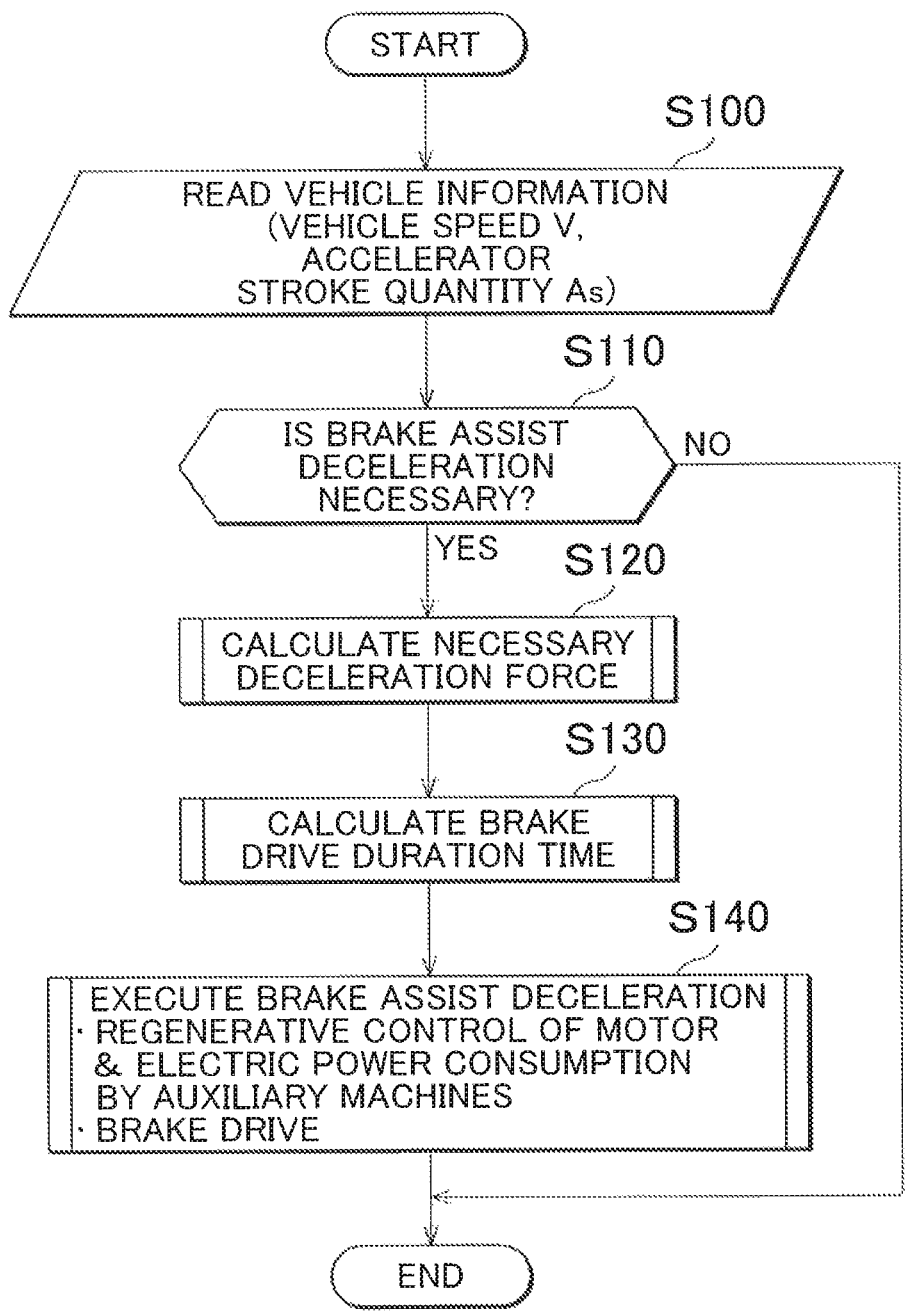
FIG. 2 is a flowchart showing a brake assist deceleration control for assisting a regenerative braking force of a drive motor 150 with a vehicle braking force by a mechanical brake 190.

FIG. 2 is a flowchart showing the brake assist deceleration control for assisting the regenerative braking force of the drive motor 150 with the vehicle braking force by the mechanical brake 190. The brake assist deceleration control is executed by the control unit 200, at a predetermined time interval after a non-illustrated ignition switch in the vehicle 10 is turned on. First, the control unit 200 reads vehicle information such as a shift range position, a vehicle speed V, an accelerator stroke quantity As showing the depression status of the accelerator pedal 20 by the driver, and a brake stroke quantity Bs showing the depression status of the brake pedal 22 (step S100). Next, the control unit 200 determines whether the brake assist deceleration is necessary (step S110), based on the read vehicle information, and in the case of making a negative determination that the brake assist deceleration is unnecessary, terminates the routine without performing subsequent processes. In step S110, in the case where the control unit 200, from the vehicle information, makes the determination of being in an acceleration situation in which the accelerator stroke quantity As increases, in a braking execution in which the brake stroke quantity Bs is detected, in a vehicle stop situation in which the vehicle speed V is zero, or the like, the negative determination that the brake assist deceleration is unnecessary is made. On the other hand, in the case where the control unit 200, from the transition of the accelerator stroke quantity As, makes the determination of being in an accelerator depression reduction situation in which the depression of the accelerator pedal 20 is reduced by the driver when the shift range position is in the drive range, in a downward slope running situation in which the depression of the accelerator pedal 20 is not changed but the vehicle speed increases, or the like, a positive determination that the brake assist deceleration is necessary is made. Here, even in the execution of the following brake assist deceleration control, the control unit 200, when detecting the brake stroke quantity Bs based on the depression of the brake pedal 22 by the driver, clears the brake assist deceleration control once, and preferentially executes a brake control for performing the vehicle braking by a braking force corresponding to the depression of the brake pedal 22.

Figure 3:
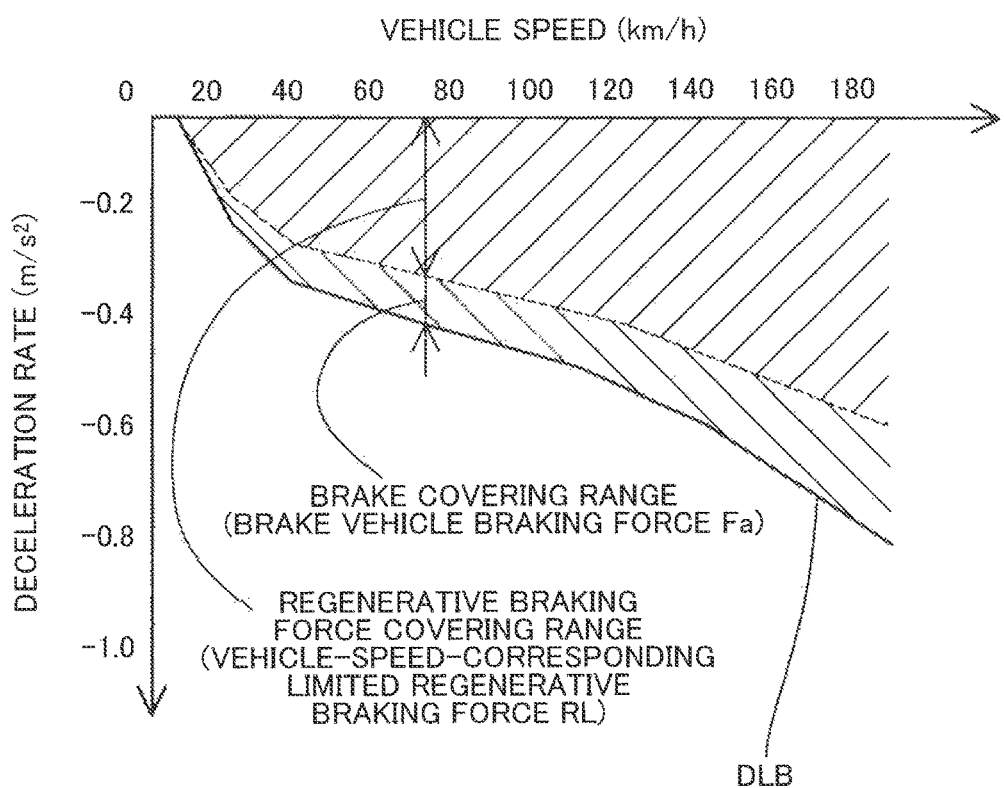
FIG. 3 is a graph showing a relation between vehicle speed and deceleration rate when brake assist deceleration is performed.

In the case of making the positive determination that the brake assist deceleration is necessary in step S110, the control unit 200 calculates a necessary deceleration force corresponding to the vehicle speed V at that time (step S120). FIG. 3 is a graph showing a relation between the vehicle speed and the deceleration rate when the brake assist deceleration is performed. FIG. 3 shows a vehicle-speed-corresponding deceleration rate line DLB indicating the deceleration rate corresponding to the vehicle speed V. The vehicle-speed-corresponding deceleration rate line DLB indicates the deceleration rate to be evaluated for each vehicle speed, and in the vehicle 10 according to the embodiment, the vehicle-speed-corresponding deceleration rate line DLB is specified so as to follow the deceleration rate by the engine brake to be obtained in the vehicle with the internal-combustion engine. Here, without following the deceleration rate by the engine brake, the vehicle-speed-corresponding deceleration rate line DLB may be uniquely specified corresponding to the vehicle speed V.

The control unit 200 evaluates the deceleration rate corresponding to the vehicle speed V read in step S100, by reference to the vehicle-speed-corresponding deceleration rate line DLB in FIG. 3, and calculates a deceleration force necessary to decelerate the vehicle to a vehicle speed resulting from subtracting the deceleration rate from the current vehicle speed V (step S120). When performing the brake assist deceleration, the vehicle 10 in the embodiment performs the deceleration corresponding to 80-90% of the deceleration rate on the vehicle-speed-corresponding deceleration rate line DLB shown in FIG. 3, with the regenerative braking force to be obtained by the regenerative control of the drive motor 150, and assists the residual deceleration with the vehicle braking force by the mechanical brake 190. FIG. 3 distinctively shows a range covered by the regenerative braking force of the drive motor 150 and a range covered by the vehicle braking force of the mechanical brake 190, with respect to the vehicle-speed-corresponding deceleration rate line DLB. That is, when performing the vehicle deceleration in a situation without the depression of the brake pedal, the vehicle 10 in the embodiment limits the regenerative braking force to be obtained by the regenerative control of the drive motor 150, corresponding to the vehicle speed V, and assists the limited regenerative braking force (vehicle-speed-corresponding limited regenerative braking force RL), with a predetermined vehicle braking force (brake vehicle braking force Fa) to be obtained by the drive control of the mechanical brake 190 regardless of the depression of the brake pedal. Then, in step S120, by reference to FIG. 3, the deceleration force necessary for the vehicle deceleration is calculated while being separated into the vehicle-speed-corresponding limited regenerative braking force RL of the drive motor 150 and the brake vehicle braking force Fa of the mechanical brake 190.

The vehicle-speed-corresponding limited regenerative braking force RL shown in FIG. 3 increases as the vehicle speed becomes higher. In the vehicle 10 according to the embodiment, even the maximum vehicle-speed-corresponding limited regenerative braking three RL shown in FIG. 3 is less than an upper limit regenerative braking force to be obtained by consuming a regenerative electric power equivalent to the maximum consumed electric power that all the auxiliary machines included in the auxiliary machine group 135 can consume. That is, the above upper limit regenerative braking force is greater than the vehicle-speed-corresponding limited regenerative braking force RL at a high vehicle speed shown in FIG. 3, and the upper limit of the vehicle-speed-corresponding limited regenerative braking force RL is set to the above upper limit regenerative braking force. Another embodiment in which the upper limit of the vehicle-speed-corresponding limited regenerative braking force RL is set to the upper limit regenerative braking force will be described later. Here, FIG. 3 is stored in a predetermined storage area of the control unit 200, as map data of the vehicle-speed-corresponding limited regenerative braking force RL and brake vehicle braking force Fa corresponding to the vehicle speed V.

Figure 4:
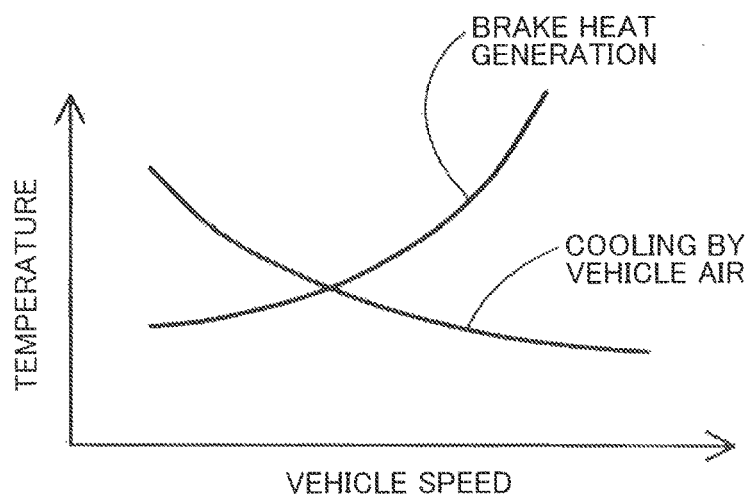
FIG. 4 is an explanatory diagram for explaining a concept for evaluating a drive duration period for the mechanical brake 190.
Figure 5:
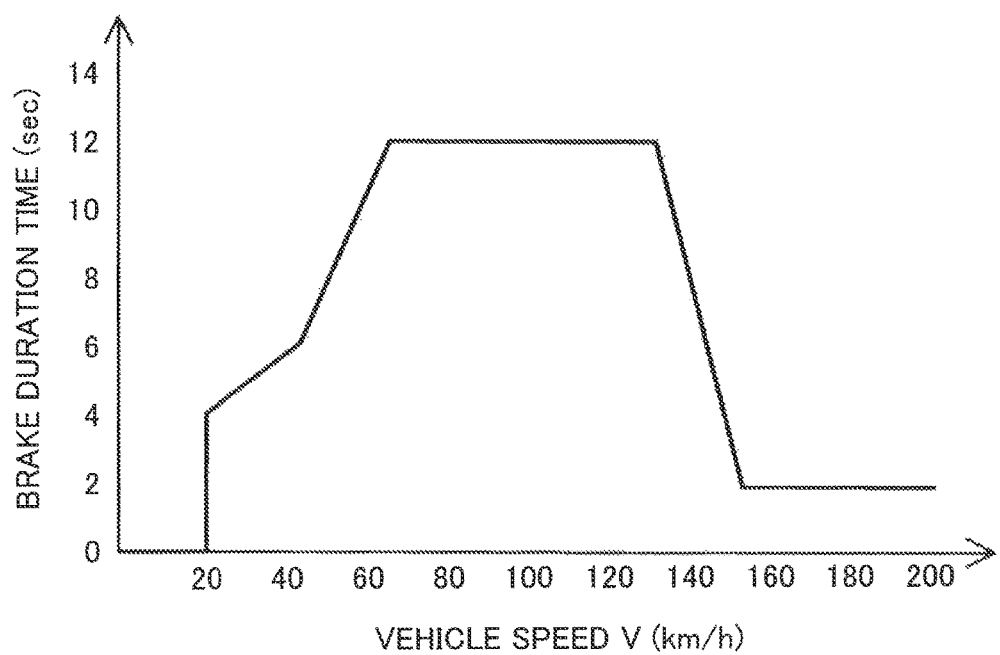
FIG. 5 is a graph showing a relation between a vehicle speed V and a brake duration time Bt.

Following the calculation of the deceleration force, the control unit 200 calculates a duration time during which the mechanical brake 190 is continuously driven (step S130). FIG. 4 is an explanatory diagram for explaining a concept for evaluating the drive duration period for the mechanical brake 190, and FIG. 5 is a graph showing a relation between the vehicle speed V and a brake duration time Bt. As shown in FIG. 4, because of having the hydraulically-driven disc brake configuration, the mechanical brake 190 of the front wheel brake 190F (see FIG. 1) and the rear wheel brake 190R generates more heat, as the drive frequency becomes higher, or as the drive time becomes higher. Typically, the drive frequency and the drive time increases as the vehicle speed becomes higher, and therefore, as shown in the figure, the brake heat generation increases as the vehicle speed becomes higher. On the other hand, as for vehicle air to flow around the mechanical brake 190 in association with vehicle running, the airflow increases as the vehicle speed becomes higher. Therefore, as the speed of the vehicle becomes higher, the cooling effect of the mechanical brake 190 increases and the brake temperature decreases. In consideration of this, the vehicle 10 in the embodiment specifies the brake duration time Bt of the mechanical brake 190 corresponding on the vehicle speed, as shown in FIG. 5, and in detail, specifies the brake duration time Bt such that the brake duration time Bt is short in a vehicle speed range of lower than 60 km/h, is long in a vehicle speed range of 60 to 120 km/h, and is short in a vehicle speed range of higher than 120 km/h. Therefore, in step S130, the brake duration time Bt corresponding to the vehicle speed V is specified by reference to FIG. 5. Here, FIG. 5 is stored in a predetermined storage area of the control unit 200, as map data.

Following the calculation of the brake duration time Bt, the control unit 200 executes the brake assist deceleration (step S140), for the vehicle deceleration by the deceleration force obtained in step S120, and terminates the routine. FIG. 6 is an explanatory diagram for explaining a manner of the exertion of the formed braking force in the brake assist deceleration and the vehicle braking force by the brake. As shown in FIG. 6, when performing the brake assist deceleration in step S140, the control unit 200, for the drive motor 150, performs the generative control of the drive motor 150 such that the vehicle-speed-corresponding limited regenerative braking force RL corresponding to the vehicle speed V decided in step S120 is obtained. Therewith, the regenerative electric power associated with the regenerative braking of the motor until the regenerative braking force of the drive motor 150 reaches the vehicle-speed-corresponding limited regenerative braking force RL is consumed by the auxiliary machine group 135 (see FIG. 1), and the consumption of the regenerative electric power is limited to the auxiliary machine group 135. Specifically, the auxiliary machine group 135 consumes the regenerative electric power associated with the regenerative braking of the drive motor 150, instead of the charged electric power of the secondary cell 130, which the auxiliary machine group 135 has consumed before then. In addition, for the mechanical brake 190, the control unit 200 continuously performs the drive control of the mechanical brake 190 for the brake duration time Bt decided in step S130, such that the brake vehicle braking force Fa corresponding to the vehicle speed V decided in step S120 is obtained.

When performing the regenerative control of the drive motor 150 such that the vehicle-speed-corresponding limited regenerative braking force RL is obtained, the control unit 200 performs the followings. When the power source is switched, the compressor of the oxidation gas supply system, the circulation pump of the coolant circulation system, and the like, which are included in the auxiliary machine group 135, require predetermined times until receiving electric power from the new power source and exerting predetermined functions. In consideration of this, in the middle of the activation of the auxiliary machine group 135, the control unit 200 makes the secondary cell 130 consume, by charge, the residual regenerative electric power when an auxiliary machine consumption regenerative electric power HRc to be consumed by the auxiliary machine group 135 is subtracted from the vehicle-speed-corresponding limited regenerative braking force RL, as a cell charge regenerative electric power VRc.

After the activation of the auxiliary machine group 135, the control unit 200 executes control such that only the auxiliary machine group 135 (see FIG. 1) consumes the regenerative electric power associated with the regenerative braking of the drive motor 150 for obtaining the vehicle-speed-corresponding limited regenerative braking force RL. Thereby, the control unit 200 limits the vehicle-speed-corresponding limited regenerative braking force RL to the regenerative braking force that is obtained through the regenerative electric power consumption by the auxiliary machines included in the auxiliary machine group 135 such as the compressor of the oxidation gas supply system and the circulation pump of the coolant circulation system.

Further, when continuously performing the drive control of the mechanical brake 190 for the brake duration time Bt such that the brake vehicle braking force Fa is obtained, the control unit 200 performs the followings. Since the mechanical brake 190 has the hydraulically-driven disc brake configuration, the vehicle braking involves an apparatus drive in which a caliper sandwiches a brake disc. Therefore, in the mechanical brake 190, the movement of the caliper, which is a driven apparatus, involves backlash at the beginning of the drive, and for the prevention of the backlash, it is useful to drive the caliper relatively greatly. In consideration of this, at the beginning of the drive of the mechanical brake 190, the control unit 200 performs the drive control of the mechanical brake 190 so as to generate an initial brake vehicle braking force Fi that is greater than the brake vehicle braking force Fa specified in step S130. The drive control for generating the initial brake vehicle braking force Fi is executed for a start time Bt1 that is shorter than the brake duration time Bt decided in step S130. Next, after the elapse of a releasing period during which the caliper of the mechanical brake 190 is being released from the brake disc, the control unit 200 performs the drive control of the mechanical brake 190 so as to generate the brake vehicle braking force Fa, for an end time Bt2 that is the residual time. After the elapse of the brake duration time Bt, the control unit 200 performs the drive control of the mechanical brake 190 such that the vehicle braking force by the mechanical brake 190 decreases gradually, and after the elapse of the releasing period, the mechanical brake 190 becomes free. Accordingly, after the elapse of the brake duration time Bt, in detail, after the elapse of the brake duration time Bt and the above releasing period, the vehicle deceleration is performed by only the vehicle-speed-corresponding limited regenerative braking force RL of the drive motor 150.

As described above, when performing the vehicle deceleration in a situation without the depression of the brake pedal 22 by the driver, the vehicle 10 in the embodiment performs the brake assist deceleration in which the regenerative braking force to be obtained by the regenerative control of the drive motor 150 is assisted with the vehicle braking force to be obtained by the drive control of the mechanical brake 190 (step S140). Furthermore, in the brake assist deceleration, the vehicle-speed-corresponding limited regenerative braking force RL shown in FIG. 3 is adopted as the regenerative braking force of the drive motor 150, and the vehicle-speed-corresponding limited regenerative braking force RL is limited to the regenerative braking force that is obtained through the regenerative electric power consumption by the auxiliary machines included in the auxiliary machine group 135 such as the compressor of the oxidation gas supply system and the circulation pump of the coolant circulation system. Accordingly, in the drive control of the mechanical brake 190 for obtaining the brake vehicle braking force Fa to assist the vehicle-speed-corresponding limited regenerative braking force RL, which is limited, it is possible to remove the influence of the electricity storage state of the secondary cell 130, and it is only necessary to perform the drive control of the mechanical brake 190 such that the brake vehicle braking force Fa is obtained. As a result, according to the vehicle 10 in the embodiment, it is unnecessary to perform the drive control of the mechanical brake 190 continuously from hour to hour, in response to the electricity storage state of the secondary cell 130, and therefore, it is possible to simplify the control of the mechanical brake 190 when assisting the vehicle-speed-corresponding limited regenerative braking force RL by the mechanical brake 190, and to perform the vehicle braking assist by the mechanical brake 190 with a high effectiveness.

The vehicle 10 in the embodiment sets the upper limit of the vehicle-speed-corresponding limited regenerative braking force RL to be obtained from the drive motor 150, to the upper limit regenerative braking force to be obtained by consuming the regenerative electric power equivalent to the maximum consumed electric power that can be consumed by all the auxiliary machines included in the auxiliary machine group 135. Therefore, according to the vehicle 10 in the embodiment, even when the vehicle-speed-corresponding limited regenerative braking force RL reaches the upper limit regenerative braking force, the vehicle-speed-corresponding limited regenerative braking force RL remains limited to the upper limit regenerative braking force. Accordingly, it is possible to achieve the simplification of the drive control of the mechanical brake 190, and therewith to enhance the effectiveness of the vehicle braking assist by the vehicle braking force that is exerted by the mechanical brake 190.

The vehicle 10 in the embodiment adopts the vehicle-speed-corresponding limited regenerative braking force RL corresponding to the vehicle speed, as the regenerative braking force to be obtained from the drive motor 150, while limiting the upper limit to the upper limit regenerative braking force corresponding to the maximum consumed electric power that can be consumed by all the auxiliary machines included in the auxiliary machine group 135. Therefore, according to the vehicle 10 in the embodiment, when the vehicle is running at a low speed, it is possible to prevent the vehicle from being greatly decelerated unexpectedly, allowing the vehicle driver to hardly feel uncomfortable, and allowing the maintenance or improvement of drivability.

The vehicle 10 in the embodiment makes up for the difference between the vehicle-speed-corresponding deceleration rate line DLB and the vehicle-speed-corresponding limited regenerative braking force RL, with the brake vehicle braking force Fa (FIG. 3) by the mechanical brake 190. Therefore, according to the vehicle 10 in the embodiment, it is only necessary to perform the drive control of the mechanical brake 190 such that the previously specified brake vehicle braking force Fa is obtained as the above difference, allowing the simplification of the drive control of the mechanical brake 190.

When assisting the vehicle-speed-corresponding limited regenerative braking force RL of the drive motor 150 with the vehicle braking force to be exerted by the mechanical brake 190, the vehicle 10 in the embodiment performs the drive control of the mechanical brake 190 so as to generate the initial vehicle braking force Fi, regardless of the depression of the brake pedal 22 by the driver, and following the control, performs the drive control of the mechanical brake 190 so as to generate the brake vehicle braking force Fa that is less than the initial vehicle braking force Fi (see FIG. 6). Accordingly, the vehicle 10 in the embodiment achieves the inhibition of the backlash at the beginning of the drive, by the disc drive with the great initial brake vehicle braking force Fi, and therefore, even by the brake vehicle braking force Fa that is less than the initial brake vehicle braking force Fi, it is possible to securely execute the vehicle deceleration (vehicle braking assist) by the mechanical brake 190.

The vehicle 10 in the embodiment executes the charge of the secondary cell 130 by the regenerative electric power of the drive motor 150, in the middle of the activation when the auxiliary machines included in the auxiliary machine group 135 consume the regenerative electric power and exert predetermined functions. This provides the following advantages. First, in the middle of the activation, it is possible to exert the regenerative braking force corresponding to the sum of the electric power of the consumption of the regenerative electric power (cell charge regenerative electric power VRc) associated with the charge of the secondary cell 130 and the consumption of the activation electric power (auxiliary machine consumption regenerative electric power HRc) by the auxiliary machine group 135. Furthermore, after the activation, the regenerative electric power consumption by the auxiliary machines included in the auxiliary machine group 135 becomes stable, and therefore, the vehicle-speed-corresponding limited regenerative braking force RL corresponding to the electric power consumption in the auxiliary machine group 135 also becomes stable. As a result, according to the vehicle 10 in the embodiment, it is possible to avoid an unexpected fluctuation in the vehicle deceleration, allowing the vehicle driver to hardly feel uncomfortable, and allowing the maintenance or improvement of drivability.

The vehicle 10 in the embodiment executes the assist of the vehicle-speed-corresponding limited regenerative braking force RL with the vehicle braking force to be obtained through the drive control of the mechanical brake 190, for the brake duration time Bt specified corresponding to the vehicle speed V (see FIG. 5). Thereby, the vehicle 10 in the embodiment performs the drive control of the mechanical brake 190 for the brake duration time Bt specified corresponding to the vehicle speed V, such that the cooling effect is exerted when the mechanical brake 190 to generate heat in association with the drive is cooled by the vehicle air to flow around the mechanical brake 190 in association with the vehicle running. Therefore, according to the vehicle 10 in the embodiment, it is possible to suppress the deterioration of the action of the brake due to the heating of the mechanical brake 190, and to enhance the effectiveness of the vehicle deceleration (vehicle braking assist) by the mechanical brake 190.

The vehicle 10 in the embodiment adopts a different time as the brake duration time Bt for each vehicle speed range of the low vehicle speed range, the middle vehicle speed range and the high vehicle speed range, and sets the brake duration time Bt for the middle vehicle speed range, in which it is hard to exert the brake cooling effect, to a longer time than the low vehicle speed range and the high vehicle speed range (see FIG. 5). Therefore, according to the vehicle 10 in the embodiment, it is possible to suppress the deterioration of the action of the brake due to the heating of the mechanical brake 190, with a high effectiveness. This leads to a further enhancement of the effectiveness of the vehicle deceleration (vehicle braking assist) by the mechanical brake 190.

Figure 7:
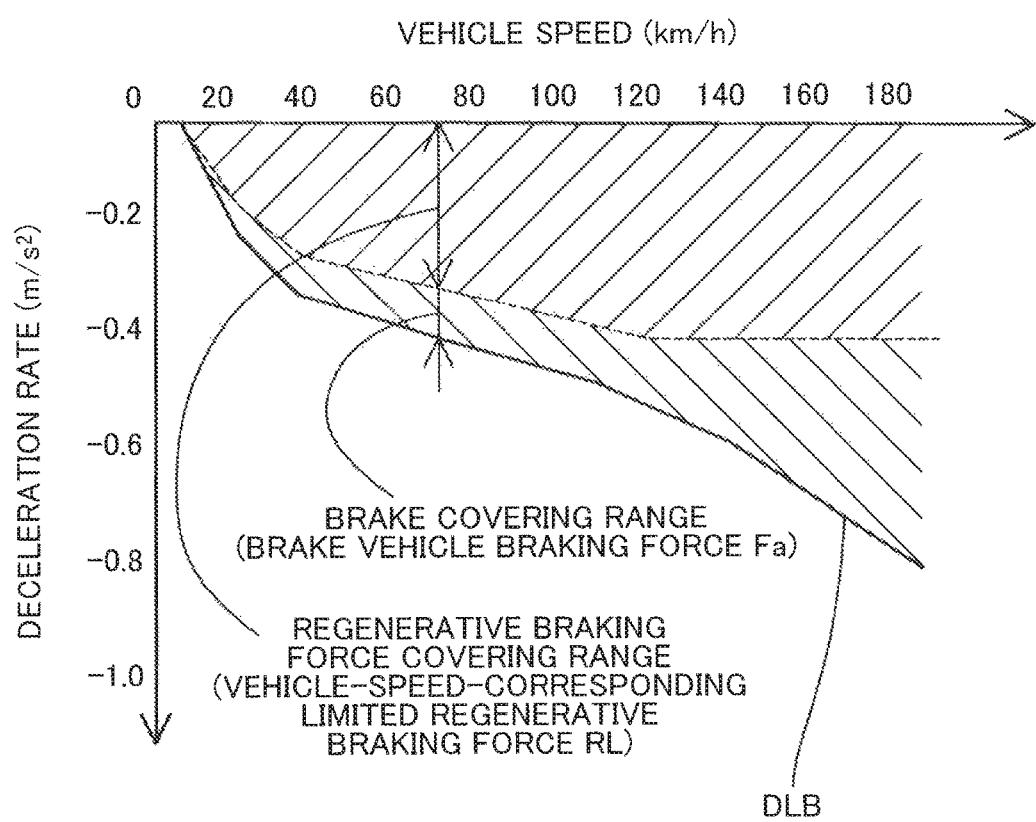
FIG. 7 is a graph showing a relation between the vehicle speed and the deceleration rate when the brake assist deceleration is performed in another embodiment.

Next, another embodiment will be described. FIG. 7 is a graph showing a relation between the vehicle speed and the deceleration rate when the brake assist deceleration is performed in another embodiment. As shown in the figure, in the embodiment, the upper limit of the vehicle-speed-corresponding limited regenerative braking force RL is set to the regenerative braking force when the vehicle speed V is 120 km/h. This is because the regenerative electric power corresponding to the maximum consumed electric power that all the auxiliary machines can consume corresponds to the regenerative braking force when the vehicle speed V is 120 km/h, because of the auxiliary machine configuration included in the auxiliary machine group 135. Therefore, in the embodiment, if the vehicle speed V is 120 km/h or lower, the regenerative control of the drive motor 150 and the consumption of the regenerative electric power by the auxiliary machine group 135 are performed such that the vehicle-speed-corresponding limited regenerative braking force RL corresponding to the vehicle speed V is obtained. If the vehicle speed V exceeds 120 km/h, the upper limit is the maximum consumed electric power of the auxiliary machine group 135 corresponding to the regenerative braking force when the vehicle speed V is 120 km/h, and the regenerative control of the drive motor 150 and the consumption of the regenerative electric power by the auxiliary machine group 135 are performed such that the vehicle-speed-corresponding limited regenerative braking force RL as the upper limit is obtained. Then, for the mechanical brake 190, similarly to the above embodiment, the drive control of the mechanical brake 190 is performed, for the assist of the vehicle braking, such that the initial brake vehicle braking force Fi and the brake vehicle braking force Fa are obtained. Also in the embodiment, the drive control of the mechanical brake 190 is not influenced by the electricity storage state of the secondary cell 130, and therefore, it is possible to exert the already-described effects.

The invention is not limited to the above-described embodiments, and can be actualized by the various configurations, in a range without departing from the spirit. For example, for the technical features of the embodiments corresponding to the technical features of the modes described in SUMMARY OF THE INVENTION, replacements or combinations can be appropriately performed, for solving some or all of the above-described problems, or for achieving some or all of the above-described effects. Further, if a technical feature is not described as an essential feature in the present description, the technical feature can be appropriately removed.

The above embodiments adopt a so-called front-wheel-drive type vehicle in which the drive force of the drive motor 150 is transmitted to the front wheels 180F, but is not limited to this. For example, it is allowable to be a rear-wheel-drive type in which the drive force of the drive motor 150 is transmitted to the rear wheels 180R, or a four-wheel-drive type in which the front and rear wheels are provided with the drive motor 150, the drive shaft 160 and the distribution gear 170.

Figure 8:
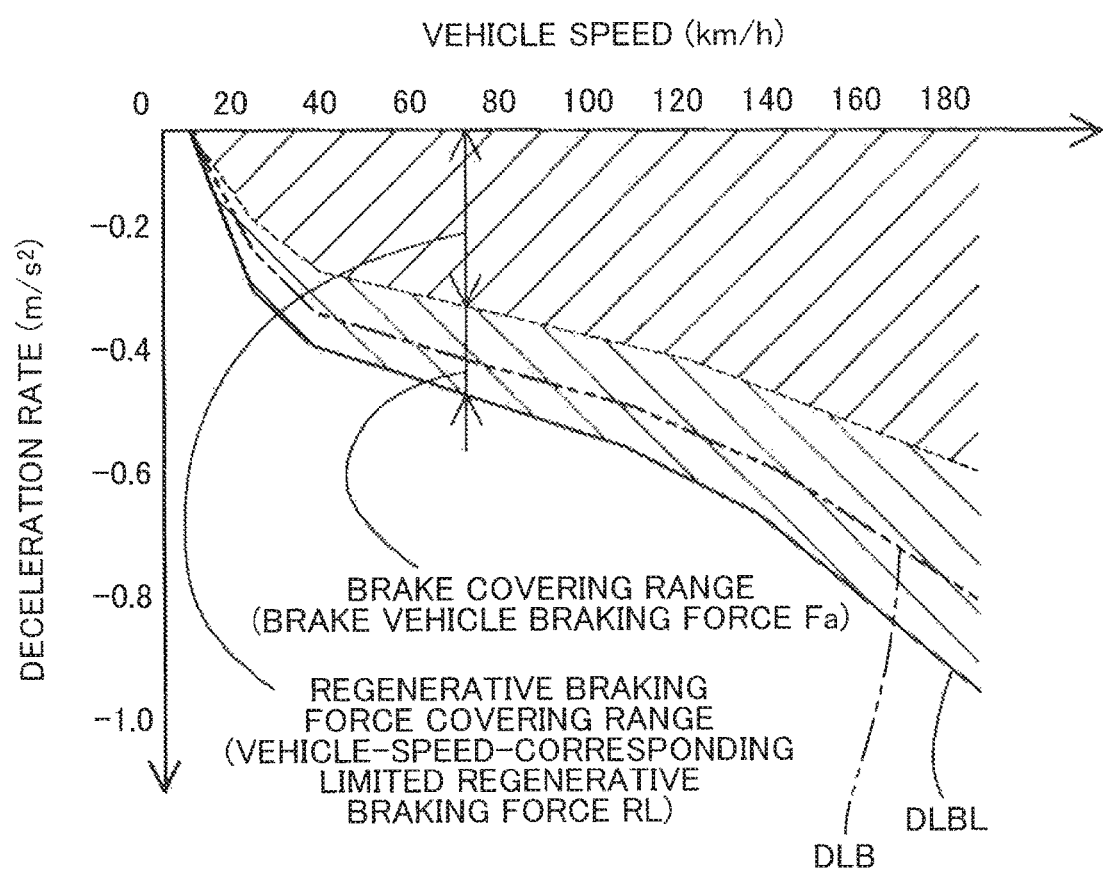
FIG. 8 is a graph showing a relation between the vehicle speed and the deceleration rate when the brake assist deceleration is performed in a deceleration enhancement mode that provides a vehicle deceleration with a greater deceleration force than a normal mode.

As the vehicle deceleration during the running in the drive range, in addition to a normal mode (see FIG. 3) that provides the deceleration corresponding to the vehicle speed V as described already, a deceleration enhancement mode that provides a vehicle deceleration with a greater deceleration force than the normal mode is employed. The deceleration enhancement mode may be dealt with as follows. FIG. 8 is a graph showing a relation between the vehicle speed and the deceleration rate when the brake assist deceleration is performed in the deceleration enhancement mode that provides a vehicle deceleration with a greater deceleration force than the normal mode. The vehicle-speed-corresponding deceleration rate line DLB in the normal mode, similarly to the above embodiments, is specified corresponding to the vehicle speed V, and in the deceleration enhancement mode, a vehicle-speed-corresponding deceleration enhancement line DLBL that is greater in deceleration rate than the vehicle-speed-corresponding deceleration rate line DLB is used. In the vehicle-speed-corresponding deceleration enhancement line DLBL, the deceleration rate increases corresponding to the vehicle speed V, and for each vehicle speed, the deceleration rate is greater than that of the vehicle-speed-corresponding deceleration rate line DLB.

When the vehicle deceleration in a situation without the depression of the brake pedal is performed using the normal mode and the deceleration enhancement mode concurrently, first, a deceleration running mode change switch for changing the setting from the normal mode to the deceleration enhancement mode is provided on a shift lever or a steering wheel. Then, in the normal mode in which the switch operation of the deceleration running mode change switch is not performed, by reference to the map corresponding to the graph shown in FIG. 3, the regenerative control of the drive motor 150 and the electric power consumption by the auxiliary machine group 135 are performed for obtaining the vehicle-speed-corresponding limited regenerative braking three RL corresponding to the vehicle speed V, and therewith, the drive control of the mechanical brake 190 with the brake vehicle braking force Fa is performed (step S140). On the other hand, if the deceleration running mode change switch is operated, for performing the control in the deceleration enhancement mode, by reference to a map corresponding to the graph in FIG. 8 instead of FIG. 3, the regenerative control of the drive motor 150 and the electric power consumption by the auxiliary machine group 135 are performed for obtaining the vehicle-speed-corresponding limited regenerative braking force RL corresponding to the vehicle speed V, and therewith, the drive control of the mechanical brake 190 with the brake vehicle braking force Fa is performed (step S140). Whether the brake assist deceleration is the brake assist deceleration in the normal mode or the brake assist deceleration in the deceleration enhancement mode, the regenerative braking force to be obtained by the regenerative control of the drive motor 150 remains limited corresponding to the vehicle speed V, and the vehicle-speed-corresponding limited regenerative braking force RL, which is limited, is assisted with the brake vehicle braking force Fa to be obtained by the drive control of the mechanical brake 190, regardless of the depression of the brake pedal. Therefore, the brake assist deceleration in the deceleration enhancement mode also can exert the already-described effects. The return from the deceleration enhancement mode to the normal mode may be performed by operating the deceleration running mode change switch again, or may be performed when a predetermined running condition based on the accelerator operation by the driver is satisfied.

In addition, in the vehicle concurrently using the vehicle deceleration in the normal mode and the vehicle deceleration in the deceleration enhancement mode, the followings may be performed. For the vehicle deceleration in the normal mode, the deceleration by the regenerative braking force based on the regenerative electric power consumption by the auxiliary machine group 135 is performed, and the brake assist deceleration by the mechanical brake 190 is not performed. Specifically, if the deceleration running mode change switch provided on the shift lever or the steering wheel is operated, for performing the vehicle braking by the deceleration force corresponding to the vehicle-speed-corresponding deceleration enhancement line DLBL shown in FIG. 8, the regenerative braking force (vehicle-speed-corresponding limited regenerative braking force RL) based on the regenerative electric power consumption by the auxiliary machine group 135 is assisted with the vehicle braking force (brake vehicle braking force Fa) by the mechanical brake 190, for the vehicle deceleration in the deceleration enhancement mode. On the other hand, if the deceleration running mode change switch is not operated or is unset, the brake assist deceleration by the mechanical brake 190 is not performed, and the vehicle deceleration based on the regenerative braking force of the drive motor 150 is performed in the normal mode. The consumption of the regenerative electric power in the normal mode can be implemented in various modes. The deceleration force corresponding to the vehicle-speed-corresponding deceleration rate line DLB (see FIG. 3) may be obtained by the regenerative braking force based on the regenerative electric power consumption by the auxiliary machine group 135 and the regenerative braking force based on the consumption of the regenerative electric power by the charge of the secondary cell 130, or priority may be given to the consumption of the regenerative electric power by the charge of the secondary cell 130. Even in this way, there is no problem in the brake drive control in the deceleration enhancement mode for performing the brake assist deceleration by the mechanical brake 190. Here, when priority is given to the consumption of the regenerative electric power by the charge of the secondary cell 130 in the normal mode, the electric power of the secondary cell 130 charged at the time of the deceleration can be used as the electric power at the time of the running after the deceleration, and therefore, this is desirable in terms of fuel efficiency improvement.

In the above embodiments, when the vehicle braking assist by the mechanical brake 190 is performed, the braking force at the beginning of the drive of the mechanical brake 190 is set to the initial brake vehicle braking force Fi that is greater than the brake vehicle braking force Fa. The initial brake vehicle braking force Fi may be a fixed value, or may vary depending on the temperature around the vehicle. For example, if the temperature around the vehicle is below freezing, the freezing of the road surface is expected. Therefore, in this case, the initial brake vehicle braking force Fi at a low temperature may be set to a braking force that is greater than the brake vehicle braking force Fa and that is less than the initial brake vehicle braking force Fi at a high temperature. Thereby, it is possible to perform the vehicle braking assist by the mechanical brake 190 while suppressing a so-called wheel lock by the brake.

In the above embodiments, as shown in FIG. 3, the deceleration rate when the brake assist deceleration is performed is specified corresponding to the vehicle speed, and the vehicle speed depends on the depression status of the accelerator pedal 20 by the driver, specifically, on the accelerator stroke quantity As, the depression-increase stroke quantity and the like. Therefore, as the graph showing the relation between the vehicle speed and the deceleration rate shown in FIG. 3, multiple graphs may be prepared corresponding to possible accelerator stroke quantities As and depression-increase stroke quantities for each vehicle speed, and in step S120, the deceleration force (the vehicle-speed-corresponding limited regenerative braking force RL and the brake vehicle braking force Fa) necessary to decelerate the vehicle to the vehicle speed resulting from subtracting the deceleration rate from the current vehicle speed V may be calculated using multiple maps for each accelerator stroke quantity As and multiple maps for each depression-increase stroke quantity. Here, when the depression of the accelerator pedal 20 is reduced, the brake assist deceleration control in FIG. 2 is executed, and therefore, it is unnecessary to consider the depression reduction quantity.

In the above embodiments, as shown in FIG. 3, the vehicle-speed-corresponding limited regenerative braking force RL is assisted with the brake vehicle braking force Fa to be obtained by the mechanical brake 190, in the whole vehicle speed range from the low vehicle speed range to the high vehicle speed range, but the followings may be performed. In the low vehicle speed range, the vehicle-speed-corresponding limited regenerative braking force RL also is small, and the auxiliary machine group 135 can consume the regenerative electric power for obtaining the vehicle-speed-corresponding limited regenerative braking force RL, with no problem. Therefore, in a vehicle speed range from the low vehicle speed range to, for example, about 60 km/h, the vehicle-speed-corresponding limited regenerative braking force RL may be generated up to the vehicle-speed-corresponding deceleration rate line DLB, without using the mechanical brake 190.

What is claimed is:

1. A vehicle comprising:
    a fuel cell that receives supply of fuel gas and generates electric power;
    a motor that is driven by a generated electric power of the fuel cell;
    an electric power consuming auxiliary machine that consumes electric power to be driven;
    a mechanical brake that generates a vehicle braking force corresponding to depression of a brake pedal;
    a secondary cell that is capable of being charged and discharged; and
    a deceleration control unit that is configured to execute vehicle deceleration in a situation without the depression of the brake pedal, while assisting a regenerative braking force to be obtained by a regenerative control of the motor, with the vehicle braking force by the mechanical brake,
    wherein the deceleration control unit is configured to, when performing the vehicle deceleration in the situation without the depression of the brake pedal, calculate a deceleration force necessary for the vehicle deceleration while being separated into the regenerative braking force of the drive motor and the vehicle braking force of the mechanical brake;
    the deceleration control unit is configured to set the regenerative braking force to be obtained by the regenerative control to an upper limit regenerative braking force corresponding to a maximum electric power that the electric power consuming auxiliary machine is capable of consuming;
    when the electric power consuming auxiliary machine is capable of the maximum electric power, the regenerative electric power associated with regenerative braking is consumed by the electric power consuming auxiliary machine and consumption of the regenerative electric power by charge of the secondary cell is avoided;
    when the electric power consuming auxiliary machine is incapable of consuming the regenerative electric power to the maximum electric power, the secondary cell consumes residual regenerative electric power by charge of the secondary cell; and
    in a case where a target vehicle braking force as a deceleration target is greater than the upper limit regenerative braking force of the motor, the deceleration control unit is configured to make up for a difference between the target vehicle braking force and the upper limit regenerative braking force of the motor, with the vehicle braking force by the mechanical brake.

2. The vehicle according to claim 1,
    wherein the upper limit regenerative braking force is set corresponding to vehicle speed.

3. The vehicle according to claim 1,
    wherein in a case where a target vehicle braking force as a deceleration target is greater than the upper limit regenerative braking force of the motor, when assisting the upper limit regenerative braking force with the vehicle braking force by the mechanical brake, the deceleration control unit is configured to assist the upper limit regenerative braking force with a first vehicle braking force and a second vehicle braking force by sequentially performing a first drive control and a second drive control in this order, the second vehicle braking force being less than the first vehicle braking force, the first drive control being a drive control that makes the mechanical brake generate the first vehicle braking force, and the second drive control being a drive control that makes the mechanical brake generate the second vehicle braking force.

4. The vehicle according to a claim 1,
    wherein the deceleration control unit is configured to execute control such that the secondary cell is charged with the regenerative electric power, in a middle of drive activation when the electric power consuming auxiliary machine consumes the regenerative electric power to be driven.

5. The vehicle according to claim 1,
wherein the deceleration control unit is configured to execute the assist of the upper limit regenerative braking force with the vehicle braking force by the mechanical brake, for an assist duration time that is specified corresponding to vehicle speed.

6. The vehicle according to claim 5,
wherein the deceleration control unit is configured to set a different time as the assist duration time for each vehicle speed range of a low vehicle speed range, a middle vehicle speed range and a high vehicle speed range, and set the assist duration time for the middle vehicle speed range, to a longer time than that for the low vehicle speed range and that for the high vehicle speed range.

\* \* \* \* \*